Aug. 18, 1970 S. ZAHLHAAS ET AL 3,524,947

CIRCUIT ARRANGEMENT FOR LONG DISTANCE TELEPHONE EXCHANGE WITH CENTRAL CONTROL INSTALLATIONS

Filed May 5, 1966 2 Sheets-Sheet 1

United States Patent Office 3,524,947
Patented Aug. 18, 1970

3,524,947

CIRCUIT ARRANGEMENT FOR LONG DISTANCE TELEPHONE EXCHANGE WITH CENTRAL CONTROL INSTALLATIONS

Siegfried Zahlhaas, Schuckertstrasse 13; Heinz Kochel, Passauerstrasse 50; and Peter Gerke, Forstenrieder Allee 60, all of Munich, Germany; Karl Rutkowski, Bernerstrasse 5, Pullach, near Munich, Germany; and Hans Baur, Oberbrunnerstrasse 24; and Ulrich Korber, Wurzelseppstrasse 14, both of Munich, Germany Filed May 5, 1966, Ser. No. 547,929
Claims priority, application Germany, May 13, 1965, S 97,085; Aug. 23, 1965, S 98,987
Int. Cl. H04q 3/04
U.S. Cl. 179—18 21 Claims

ABSTRACT OF THE DISCLOSURE

A telephone exchange system in which a first received set of dial signals is evaluated as route determining digits in a first circuit system such as a register or dial receiver, the subsequent signals are evaluated as call connection digits and are switched over to a second circuit system such as a connection set. A supervision system insures that the switchover occurs only following the route determining digits and only in the interval between dial signals.

GENERAL DESCRIPTION

This invention relates to telephone exchange installations and, more particularly, to telephone exchange installations of the switching matrix type and having improved control systems for effecting changeover or switchover from a first circuit system which assists in determining the route of a demanded call connection to a second system which corresponds to the route and which assists in completing the demanded call connection.

In accordance with the invention, the telephone exchange installation comprises a switching matrix to the input terminals of which is connected the subscriber circuit of each of a plurality of subscribers. A marker which responds to the dial information code of a calling subscriber effects switching of the matrix to provide coupling paths therethrough for connecting the calling subscriber with an appropriate one or more of a plurality of circuit systems connected to the output terminals of the matrix, which circuit systems complete the demanded call connections. The exchange installation of the invention is automatic in operation and provides for establishing both local calls and long distance calls.

Local calls are defined as those between two subscribers associated with a given installation. In completing a connection for a local call, an internal connection set, connected at its input and output terminals to corresponding output terminals of the matrix, is coupled through the matrix to connect the calling subscriber to the local, called subscriber for completing the local call connection. The completion of local call connections by such techniques is well known in the art.

The subject invention relates more particularly to the operation of a telephone exchange installation for establishing external or long distance call connections. An external or long distance call connection is defined herein to include a call connection from a calling subscriber, connected to a given installation, to a called subscriber connected to a remote installation, either within the same or a remote exchange area. The dial information code dialed by a calling subscriber for demanding an external call connection includes a first group of digits defined as route determining digits and a second group of digits defined as call connection digits. In accordance with the invention, there is provided a first circuit system for responding to the first group of route determining digits and a second circuit system for effecting transmission of the second group of call connection digits to the remote installation corresponding to the demanded external call connection. Each of the second circuit systems is associated with an external line corresponding to a predetermined route for long distance calls.

The provision of the described first and second circuit systems provides greater efficiency and speed in the operation of the exchange installation. Only a minimum number of the described first circuit systems is required for a given installation, since the route determining function thereof requires that the first system be connected with the calling subscriber only for receipt and identification of the first group of route determining digits. When the first system has completed this function, it may be disconnected and thus may be made available immediately thereafter for connection with a different calling subscriber. The second circuit systems which transmit the dial information codes to remote installations are permanently assigned to a given route. Thus, upon switchover of the calling subscriber from the first to an appropriate second circuit system corresponding to the route of the demanded connection, subsequent digits of the dial information code may be immediately transmitted, as received, over the second system to its corresponding external line. Intermediate storage of the dial information code is thereby rendered unnecessary, and maximum speed in establishing a given call connection is attained.

Under ideal or non-overload conditions, the first and second systems selectively receive the dial signals corresponding to the first and second groups of digits, respectively, of a dial information code. The circuit of the calling subscriber is switched from the first to the second circuit system following determination of the route of the called subscriber from the first group of digits and prior to the occurrence of the second group of digits. Switchover therefore occurs during the blanking period or dial pause between the dial signal representing the last digit of the first group, and before the dial signal representing the first digit of the second group. Limiting the occurrence of switchover to a blanking period is essential to proper circuit operation since, if switchover were to occur indiscriminately, dial signals received during switchover would be mutilated or lost and the demanded call connection, if completed at all, would be completed incorrectly.

The criticality of the time of occurrence of the switchover results not from the speed with which the switchover can be effected in any given case, but rather from the fact that in the installation of the invention only a single marker for controlling the switching of the matrix is provided. The provision of a single marker is desirable in that it consolidates and simplifies the control systems and switching processes of the installation and minimizes the cost thereof. However, since only a single marker is provided, during heavy load conditions on the installation, i.e., exceptionally large numbers of subscribers demanding call connections at a given time, the marker may not be available to respond to a request for effecting the necessary commutation. As a result, dial signals representing the second group of digits may be transmitted to the installation before switchover of the calling subscriber to the second circuit system has been achieved.

Two embodiments of the installation of the invention are disclosed herein. In accordance with each of these embodiments there is provided a supervision circuit system which cooperates with the marker of the switching matrix to expand or extend the permissible periods of switchover, in addition to preventing switchover during forbidden times, such as during the receipt of subsequent dial signals. Thus, the supervision circuit system cooperates with the marker of the switching matrix to switch the calling subscriber from the first to the second circuit system during a blanking period or dial pause between two dial digits and subsequently to completion of the route determining function of the first system. Dial signals representing, or related to, the second group of digits received in the first system in overload conditions are transmitted from the first system to the second system.

In accordance with the first embodiment of the invention, the signals thus received and transmitted may comprise preparation signals of tone frequency dial signals and, in accordance with the second embodiment of the invention, the dial signals themselves. The means for providing this versatile response requires little additional expenditure for the installation, yet results in considerable expansion of the permissible time periods in which switchover can occur.

In the first embodiment of the invention, the permissible switchover period is expanded by two independent techniques. The first technique permits switchover to occur immediately following evaluation of the entire first group of digits, and thus before the termination of the dial signal representing the last digit of the first group of route determining digits. The remaining portion of the last dial signal is therefore additionally available for switchover. The second technique relates to tone frequency dial systems and permits switchover to occur during the receipt of a preparation signal related to the tone dial signal representing the first digit of the second group of call connection digits. In accordance with a modification of the first embodiment, switchover may also be permitted to occur during the blanking period between dial signals of the second group of digits, the switchover period also being expanded, as described, for each such subsequent blanking period.

In accordance with the first embodiment of the invention, there is provided a subsequent transmission register selectively connectable to an external connection set for receiving, registering, and subsequently transmitting the second group of dial signals over the external connection set to an external line. There is further provided a transmission network which may be requested by the first system under overload conditions and when certain restrictive conditions have been satisfied, to effect the transmission of dial signals of the second group to the subsequent transmission register prior to switchover. The transmission network itself provides no registration function. In the embodiment disclosed, the particlar signal which may be thus transmitted comprises the preparation signal of a tone frequency dial signal. Due to the restrictive conditions under which the transmission network may be requested, only very few and preferably only a single such transmission network is provided for a given exchange installation.

The evaluation of the first group of dial signals received in the first circuit system is completed substantially simultaneously with receipt of the last dial signal of the first group thereof, and thus before the end of the last dial signal. Upon completion of the evaluation, a request signal is transmitted to the marker for requesting switchover of the calling subscriber to the second circuit system. If the marker does not respond, due to overload conditions, within a predetermined time period, the supervision circuit and transmission network are requested to effectively extend the time period such that the marker has a longer time to respond for effecting the switchover.

Means comprising a travel time switch in each first circuit system is provided for establishing the predetermined time period. The travel time switch produces a request signal for the transmission network if the marker has not responded by the end of the predetermined time period, which request signal is transmitted to the marker. The travel time switch is energized only subsequently to receipt of the entire first group of digits in the first circuit system and produces the request signal only after the elapse of the predetermined time period, which comprises a predetermined portion of the blanking period or dial pulse following the last dial signal of the first group of dial digits. As a result, the transmission network is not even requested until a substantial portion of the time duration of the blanking pulse has elapsed, and is seized only for a brief portion of the blanking period.

The travel time switches may be energized either simultaneously with completion of the evaluation of the first group of dial signals or upon termination of the last dial signal of the said first group. In addition, the request to the transmission network is produced only in the event that switchover has not occurred prior thereto. The switchover therefore may occur at any time upon completion of the evaluation of the first group of dial signals, and thus during the remaining portion of the last dial signal, and during the portion of the dial pause or blanking period defined by the travel time switch and only thereafter is a request made for the transmisison network. In addition, the transmission network is seized only in those instances in which dial signals are transmitted in extremely quick succession.

The restrictive conditions thus imposed on the making of a request for the transmission network maximize its availability to the plurality of circuit systems of the installation and therefore maximize its effectiveness in expanding permissible switchover periods during excessive loading conditions of the installation. Since only a single, and not a large number, of transmission networks, need be provided, the control means for effecting the connection into circuit of the transmission network are greatly simplified, reducing the cost of the installation, yet providing greater flexibility in its operation under overload conditions.

In accordance with the second embodiment of the invention, the permissible periods of switchover include the dial pause or blanking period following the last dial signal of the first group of route determining dial signals, and the blanking periods betwen any two subsequent dial signals of the second group of dial signals. The installation includes a central register for receiving and registering both the first and second groups of dial signals. The register provides for evaluating the first group to determine the route of the call connection and for transmitting the second group of dial signals to the external connection set and associated external line corresponding to the determined route for completing the call connection.

The installation further includes a first circuit system and a second circuit system for selectively receiving the first and second groups of dial signals, respectively. For this purpose, the calling subscriber is switched from the first to the second circuit system following the end of the first group of dial signals, under normal conditions. The first and second systems successively transmit the dial signals thus received to the central register. Dial signals of the second group, received in the first circuit system during overload conditions, are also transmitted to the central register for temporary storage prior to completion of the switchover. Following commutation, the temporarily stored dial signals are transmitted to the second system in proper time sequence relatively to subsequently received dial signals for transmission to the external line.

The burdening of the central register for effecting the described registration, however, is minimized. The burdening is minimized in one manner by avoiding the necessity of simultaneously registering all dial signals of a dial information code. For this purpose, the central register is connected to the first system only when the latter has identified and determined the digit represented by a dial signal, to receive that digit value, and thereafter is disconnected.

The burdening of the central registers for providing temporary registration is also reduced by terminating the temporary registration function subsequently to completion of the switchover and transmission of the previously received and temporarily stored dial signals, and prior to the receipt of subsequent signals of the second group thereof. More specifically, the dial signals of the second group thereof received subsequenlty to completion of switchover are transmitted without temporary storage. As a result, the temporary registration is required only when the switchover has been postponed due to overload demands on the marker. The central register therefore also operates as an auxiliary dial circuit system. Dial signals received over a first circuit system are registered in the central register and are also transmitted by the central register to a second circuit system for transmission over the external line associated therewith.

When the route of the demanded call connection has been determined by the central register, the marker associated therewith establishes a connection path through the matrix for coupling the calling subscriber to the appropriate second circuit system. The calling subscriber remains connected to the first system, and thus is connected to both a first and a corresponding, appropriate second system.

The installation also includes a supervision circuit which effects the switchover. A first circuit system produces a request signal for the supervision circuit to effect switchover of the calling subscriber from the first to the second circuit system. The request signal indicates that the route determining function of the first system is completed and that the latter is connected to an appropriate second system. The request signal is produced only during a permissible switchover period, which may be any blanking period subsequent to the first group of dial signals. The increased number of permissible switchover periods greatly reduces the criticality of commutation and assures successful completions of demanded call connections.

Means are provided for scanning the first systems to determine their requests for switchover and for selectively connecting the supervision circuit thereto to carry out the switchover. Switchover is effected by enabling operation of the second system and thereafter disabling the first system by terminating the connection of the calling subscriber to the first system. The disabling and enabling operations are achieved by deenergizing and energizing appropriate relays of the first and second systems, respectively, whereby the time required for the switchover process is merely that of the response periods of the relays.

The switchover therefore occurs in response to the recognition by the supervision circuit of a request for switchover, which request occurs only during a blanking period and comprises a signal produced by the first circuit system indicating that a second circuit system has been coupled to the calling subscriber. Switchover therefore occurs in a positive manner and following completion of the switching functions of the matrix under control of the marker. Further, since switchover is not effected by the marker, the switching functions of the latter are not limited to the blanking periods, but may occur at any time. As a result, time conditions for switchover are greatly expanded.

PRIOR ART

In centrally controlled telephone exchange installations, the circuit systems and connections typically are subdivided in accordance with the requirements for providing internal connections and external connections. Internal connections are defined as those between subscribers connected to a given exchange installation. External connections are defined as those between a subscriber connected to a given installation and a subscriber connected to a remote installation either within the same or a remote exchange area. In such installations, there are provided internal connection sets and external connection sets for completing, respectively, local and long distance calls.

In accordance with one form of such exchange installations, the external connection sets are provided in common for all external traffic routes. In such installations, two switching matrices are required, one matrix for connecting calling subscribers with either an internal or an external connection set in accordance with the demanded call connection, and a second matrix for connecting the external connection set to an appropriate external line corresponding to the traffic route of the demanded call connection.

In a second form of prior art exchange installations, the external connection sets are assigned permanently to given external lines and thus are identified with predetermined traffic routes. In this latter type of installation, subscribers are connected through their corresponding subscriber circuits to the input terminals of a single switching matrix and both internal and external connection sets are connected to the output terminals of the same switching matrix. Since the route of each external connection set is defined, the latter type of installation typically provides for auxiliary dial circuit systems which are connectable over the switching matrix to the external connection sets.

The auxiliary dial circuit system may comprise a dial receiving register, accessible to all circuit systems as a central register, which registers the dial information code, digit by digit, received from a calling subscriber and thereafter transmits the code to an external connection set for transmission over the latter's associated external line. A central dial register of this type therefore performs a dual function in that it both registers the dial signals, upon receipt from a first circuit system such as a dial receiving register, and thereafter transmits the dial signals as a complete dial information code to a corresponding second circuit system such as an external connection set.

In such a centrally controlled exchange installation, a number of digits, which may be all or only the first few of the digits of the entire dial information code of the demanded call connection must be registered in and evaluated by the central register before the connection of appropriate circuit systems to complete the call can be commenced. Typically, the dial signals are received digit by digit in a register. When all required dial signals for establishing the call connection are received and evaluated, the appropriate circuit connections thereupon are established.

If the demanded call connection is for a local call, the installation provides an internal connection through an internal connection set. The matrix is switched by the marker to connect the calling subscriber to the internal connection set and also to connect the internal connection set again through the matrix to the local called subscriber. After transmission of a calling signal by the internal connection set, and answering of the call by the called subscriber, the demanded connection is established and thereafter maintained until the call is terminated.

If the demanded connection is for a long distance call, the marker establishes a coupling path through the matrix to connect the calling subscriber with an external connection set assigned to the appropriate route of the demanded call connection. The appropriate route is determined by the central register by evaluation of the first group of digits registered therein. The remaining digits of a given dial information code contain the information required by the remote installation for completing the call connection, and are defined as the second group, or call connection group of digits.

The second group of digits of the dial information code are also received by and registered in the above mentioned central register, in digit by digit fashion as dialed by the calling subscriber. In completing an external call, a digit transmission register is connected to the external connection set. The second group of digit signals then are transmitted by the register to the digit transmission register, in digit by digit or sequential fashion, for transmission over the external connection set and the corresponding external line to the remote installation. The digit transmission register therefore is coupled to the external connection set for the time necessary to effect the sequential transmission of the dial information code to the remote installation.

Such prior art installations operate under a process known as verification numbering, which requires that the entire dial information code necessary for the entire establishment of the external call connection be registered in the central register prior to commencement of the switching processes at the local exchange installation for establishing the appropriate connections. In a verification numbering system, the value of a certain fixed position digit, i.e., fixed in a position relative to the series of digits of a given dial information code, determines whether the demanded call connection is for a local or long distance call and thus for an internal or an external connection, respectively. Thus, the presence of a first or a second number as the fixed position digit, which normally is the first digit of the dial information code, immediately defines the routing of a call as internal or external, respectively.

By requiring that a predetermined number of digits constitute the information code for internal or external calls, and by recognizing the fixed position digit, a verification system also recognizes the termination of the dial information code for either type of call. As a result, in verification numbering systems, the commencement of any connections even within the local exchange installation is delayed until termination of the dial information code has been recognized. The subsequent transmission of the dial information code over an external line can be very rapid, since the subsequent transmission is completely independent in its speed from the dial speed of the subscriber. A verification numbering system therefore minimizes the time of seizure of an external connection set and its corresponding external life for dial signal transmission purposes.

In verification numbering systems, however, certain detrimental requirements are imposed on the circuit operation. For example, the requirement that all digits of a dial information code be registered before a circuit connection can be established results in a substantial delay in completing the connection. Further, registration of all the digits is superfluous, since only the first few—i.e., the route identifying group of digits—are employed by the installation and processed thereby for completing an external connection. The second group of digits are of significance as to their information content only to the remote installation.

In addition, since the termination of the dial information code must be identified before the exchange installation processes can be commenced, the dial information code must contain a predetermined number of digits. Frequently, some of the predetermined number of digits are unnecessary for certain external connections; however, since recognition of termination of the information code requires that the code contain the predetermined number of digits, filler digits having no connection information significance must be included in the dial information code. The use of filler digits imposes an additional and undesirable burden on the calling subscriber and on the systems of the installation which process the dial information code. For example, the registers and other storage means, the evaluation means and other similar circuit means must process the filler digits despite their lack of any significance to the demanded call connection, either at the local or at the remote exchange installation.

A further disadvantage of verification numbering systems results from the time lost in establishing the call connection. The time lost is quite apparent to the calling subscriber and may comprise a period of up to 30 seconds from the completion of dialing by the subscriber to the initiation of transmission of the dial information code to the installation of the called subscriber. The terms "calling delay" and "calling delay time" have evolved in the long distance telephone exchange art to characterize this commonly encountered problem of delay in verification systems.

OBJECTS OF THE INVENTION

The subject invention overcomes these and other disadvantages of prior art systems and provides for the rapid and efficient transmission of dial information codes for establishing demanded long distance call connections. In particular, the system of the invention provides for initial connection of a calling subscriber to a first circuit system which receives and evaluates a first group of route-defining digits of a dial information code transmitted by the calling subscriber, and switchover of the calling subscriber thereafter to a second circuit system associated with the route thus defined for transmission of a second group of digits of the dial information code transmitted by the subscriber and defining the connection to be established at a remote installation. The calling subscriber may transmit the first and second groups in a substantially continuous manner, without any indication or awareness of the occurrence of the communication. The transmission of the second group of digits proceeds substantially simultaneously with the receipt thereof by the installation from the calling subscriber, whereby the detrimental time delay incurred in verification numbering systems is avoided.

Furthermore, the system of the invention provides for utilization of a single switching matrix through which the calling subscriber is selectively coupled to internal and external connection systems. Switchover is controlled in accordance with the operation of a supervision circuit system, which assures that switchover does not occur during receipt of subsequent dial signals which might cause the latter to be mutilated or lost and thus assures that correct call connections are established. Furthermore, the exchange installation of the invention provides for maximum utilization of the circuit systems associated with the installation, whereby maximum efficiency is attained and whereby the total number of circuit systems and the cost of an installation having a predetermined load handling capability is minimized.

It is therefore an object of this invention to provide an improved telephone exchange installation for establishing long distance call connection.

A further object of this invention is to provide an improved telephone exchange installation wherein a calling subscriber is switched from a first circuit system, which defines the route of the demanded call connection, to a second circuit system, which transmits the dial information code substantially simultaneously with receipt thereof by the installation to a remote installation for completing the demanded call connection.

Another object of this invention is to provide an improved telephone exchange installation for switching commutating a calling subscriber from a first to a second circuit system which provide, respectively, for evaluation of a first group of route defining digits and transmission of a second group of connection defining digits of a dial information code transmitted by the subscriber, while assuring that digits of the dial information code are not mutilated or lost during the switchover despite overload conditions which delay the switchover.

Still a further object of this invention is to provide an improved telephone exchange installation wherein switchover of a calling subscriber from a first to a second circuit system is effected under control of a supervision circuit system.

Still another object of this invention is to provide an improved telephone exchange installation providing central control for all essential processes and operations thereof and achieving maximum utilization of associated circuit systems at minimum cost.

These and other objects of this invention will become apparent in the following description and drawings thereof, in which.

DESCRIPTION OF THE INVENTION

Figure 1:
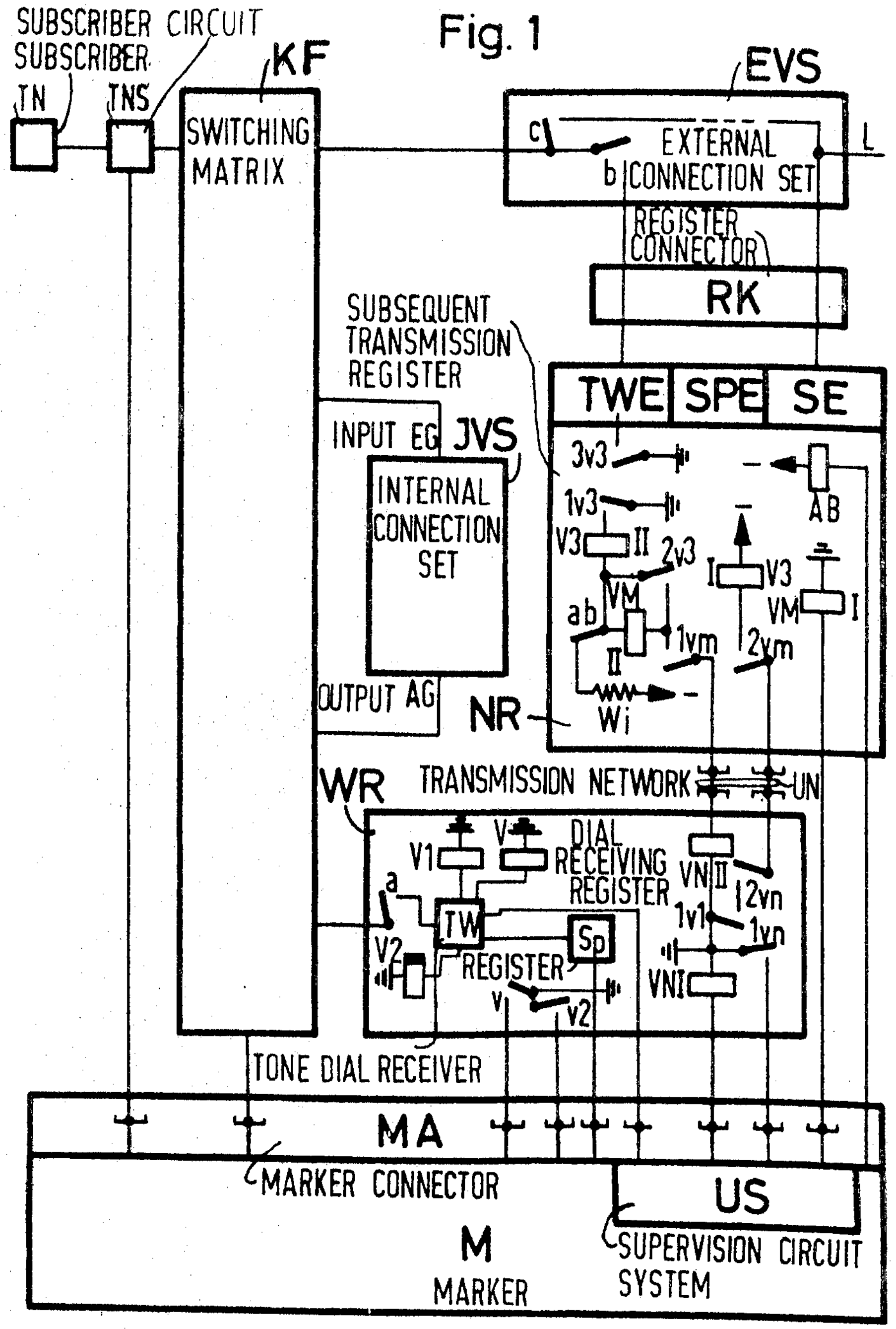
FIG. 1 shows, partially in block diagram form, a first embodiment of the telephone exchange installation on the invention.
Figure 2:
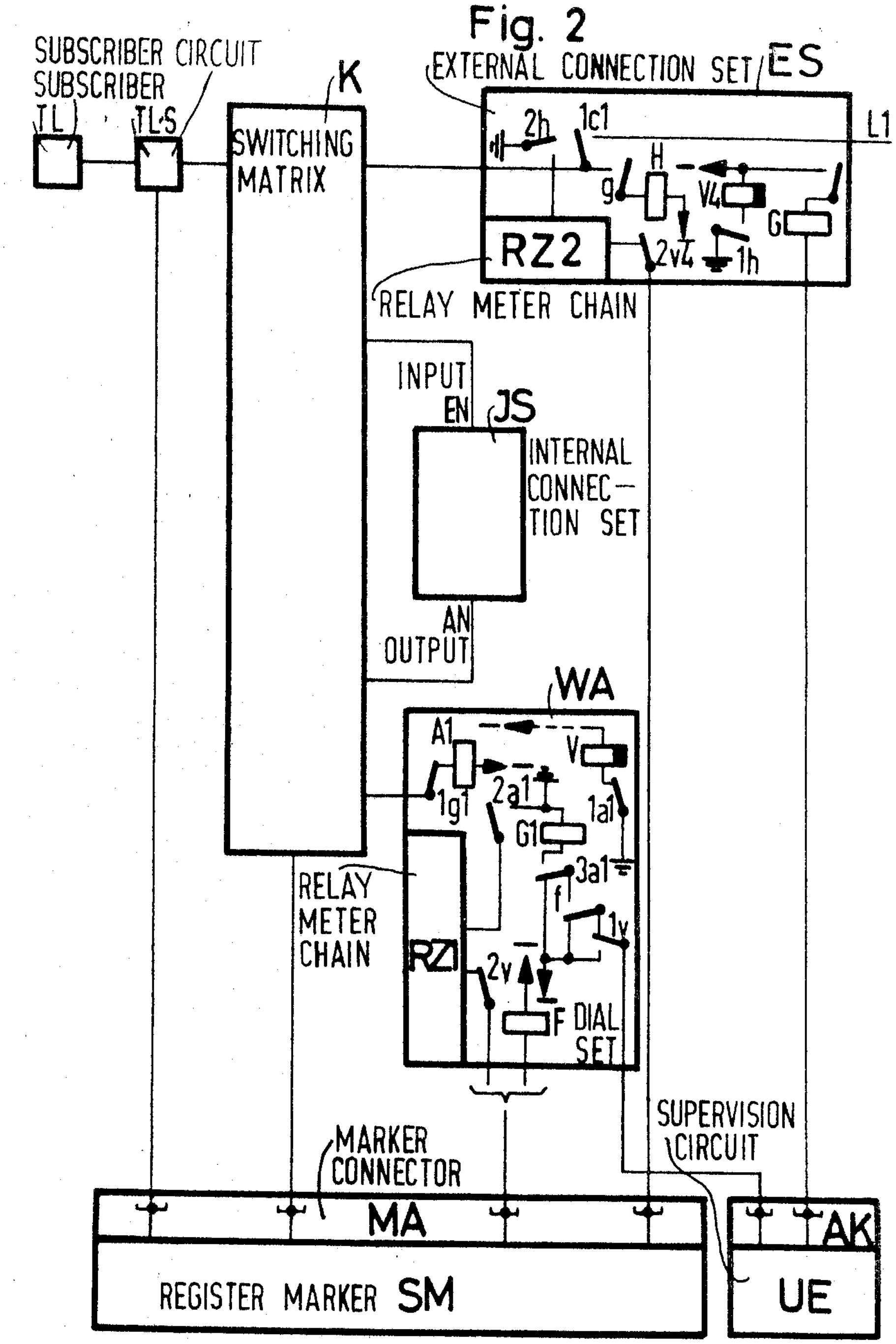
FIG. 2 shows, partially in block diagram form, a second embodiment of the telephone exchange installation of the invention.

FIGS. 1 and 2—Summary

The long distance telephone exchange installation of the invention is shown in first and second embodiments in FIGS. 1 and 2, respectively. In the following detailed description of the invention, reference will be had concurrently to FIGS. 1 and 2 in describing elements thereof which are substantially similar in operation.

In the installations of FIGS. 1 and 2, there are provided, respectively, switching matrices or networks KF and K, to the input side of which are connected a plurality of subscribers and their respective subscriber circuits. In FIGS. 1, a subscriber TN is connected to the input of its corresponding subscriber circuit TNS and a first output of the latter is connected to the input of switching matrix KF. Similarly, in FIG. 2, subscriber TL is connected to the input of its corresponding subscriber circuit TLS and a first output of the latter is connected to an input of the switching matrix K. The provision of a plurality of subscribers and respectively associated subscriber circuits connected to corresponding input terminals of a switching matrix is well known in the art and, therefore, only one such subscriber and subscriber circuit have been shown in each of FIGS. 1 and 2 for clarity in the illustration of the installations of the invention disclosed therein.

The installations of FIGS. 1 and 2 further include central markers M and SM, respectively, the central markers M and SM having respectively associated therewith marker connection couplers MA and MA, respectively. There is schematically shown in each of the marker connection couplers MA a plurality of connection elements for connecting the couplers MA to various of the circuit systems of the installation. The function of the marker connection couplers MA relative to the other circuit systems and with respect to their control of the respectively associated central markers M and SM is well known in the art and, therefore, will not be described in detail herein.

The central markers M and SM further have associated therewith supervision circuits US and UE, respectively. Connection of the supervision circuit US to other circuit systems of the installation of FIG. 1 is effected through the marker connection coupler MA. Connection of the supervision circuit UE to other circuit systems of the installation of FIG. 2 is effected through a connection coupler AK associated therewith and distinct from the marker connection coupler MA. If desired, however, the marker coupler MA may be adapted to perform the functions of the coupler AK in FIG. 2.

The installations of FIGS. 1 and 2 further include internal connection sets JVS and JS, respectively, the set JVS being connected at its input EG to an output terminal of the switching matrix KF and at its output AG to a second output terminal of the switching matrix KF. Similarly, the input and output terminals EN and AN of the internal connection set JS of FIG. 2 are connected to respectively associated output terminals of the switching matrix K. The internal connection sets JVS and JS provide for completing local calls in the installations of FIGS. 1 and 2, respectively, in a manner to be described.

Local calls are defined as call connections between two subscribers connected to the same installation and thus, for example, in the installation of FIG. 1, between a first subscriber TN connected to the switching matrix KF and a second subscriber (not shown) also connected to switching matrix KF, and, in the installation of FIG. 2, between a first subscriber TL connected to switching matrix K and a second subscriber (not shown) also connected to matrix K.

The installations of FIGS. 1 and 2 also provide for completing long distance calls, such as calls to a remote installation within the same exchange area or to remote exchanges. The demand of a calling subscriber for any such type of long distance call shall be described hereinafter as a demand for an external connection. The line L in FIG. 1 and the line L1 in FIG. 2 are defined to comprise external lines providing connection of the respective installations in accordance with a predetermined route and thus to an appropriate remote installation or to a remote exchange. The installation of FIGS. 1 and 2 have associated therewith a plurality of such lines L and L1, although only a single one is shown in each case for clarity in illustration. The plurality of such lines are arranged in groups thereof in accordance with the routes which may be selected for connection to external exchange installations.

The installations of FIGS. 1 and 2 each include first and second circuit systems and means for providing switchover from the first to the second circuit system for completing a long distance call in accordance with the demand of an associated, calling subscriber for an external connection. The first circuit systems comprise dial signal receiving circuit systems, hereinafter referred to as the dial receiving register WE of FIG. 1 and the dial set WA of FIG. 2. The number of dial receiving circuit systems provided in the installations of each of FIGS. 1 and 2 is determined in accordance with traffic load requirements at the installation. Only one such first circuit system is shown in each of the installations of FIGS. 1 and 2 for clarity of illustration, although a plurality thereof would be provided in an actual operating system.

The second circuit systems of the installations of FIGS. 1 and 2 comprise the external connection sets EVS and ES, respectively. The external connection sets EVS and ES are connected at their outputs to respectively associated external lines L and L1 and at their inputs with an output terminal of the respectively associated matrices KF and K.

The following discussion comprises a summary of the operation of the installations of FIGS. 1 and 2 with concurrent reference to the respective circuit systems thereof. Upon initiating a call, a subscriber such as TN or TL causes a signal to be transmitted to the central marker M or SM. Typically, this signal is produced by the subscriber's lifting the telephone receiver of his telephone set from its cradle. Thereupon a signal is transmitted from a second output of the subscriber circuit TNS or TLS to the marker coupler MA of the respectively associated central markers M and SM. The central markers M and SM respond to the signal to effect a switching operation in the respectively associated switching matrices KF and K to connect the subscriber circuits TNS and TLS to the respectively associated dial receiving register WE and dial set WA. In effecting this connection, the central markers M and SM perform a scanning operation to select a register WE or dial set WA which is currently available for performing exchange functions—i.e., is not participating or seized in a previously established circuit connection.

The first circuit system transmits a signal to the subscriber indicating that he may commence dialing of the necessary digits identifying a desired connection. The first circuit system responds to the dial signals representing a first group of the digits thus dialed to identify the type of connection—i.e., whether external or internal—which the subscriber has demanded. Upon receiving a sufficient number of dial signals corresponding to the digit information necessary for identifying the type of connection demanded, a request signal is produced which is received by the marker connection couplers MA and submitted to the corresponding markers M and SM to request the latter to effect the necessary switching of the matrices KF and K to connect the calling subscriber with a circuit system adapted to complete the demanded call connection.

If the subscriber TN or TL has demanded an internal connection, the associated matrix KF or K is switched to connect the subscriber TN to the input EG or EN of an available internal connection set JVS or JS, respectively, and to terminate the previously established connection to the first circuit system, i.e., the dial receiving register WE or the dial set WA, respectively.

The internal connection sets JVS and JS operate to continue the energy supply to the corresponding subscriber TN or TL, to receive the remainder of the dial information code produced thereby and to complete the connection to the local subscriber. In completing the circuit, the internal connection sets JVS and JS request the respectively associated central markers M and SM to effect a switching of the matrices KF or K to connect the respective output terminals AG or AN thereof to the subscriber circuit of the called subscriber. If the called subscriber answers, the internal connection sets JVS and JS establish a speaking connection between the calling and called subscribers and thereafter operate to terminate the local connection upon completion of the local call. The operation of internal connection sets for performing the above-described functions is well known and is not described further herein.

If the calling subscriber demands an external connection, the first circuit systems—i.e., the dial receiving register WE and the dial set WA—operate to assist in recognizing the demand for an external connection and identifying the route thereof, and is requesting the associated central markers M and SM to complete a connection of the calling subscriber to the corresponding external connection sets EVS and ES, respectively, associated with that route. The external connection sets EVS and ES thereupon respond to subsequent digits of the dial code, and, either through internal systems or external systems associated therewith, transmit the dial information code to the remote installation to complete the long distance call demanded by the calling subscriber.

Thus, in each of the installations of FIGS. 1 and 2, the calling subscriber is initially connected to a first circuit system, termed the dial receiving circuit system, which assists in identifying the demanded connection as either a local or an external connection and, if the latter, the route thereof. The calling subscriber thereafter is switched to a free or available second circuit system associated with the route thus identified and operative to complete the demanded call connection by transmitting the information code to the remote exchange installation.

The manner of effecting the switchover of the calling subscriber from the first to the second circuit systems is described separately hereinafter with regard to the installations of FIGS. 1 and 2.

FIG. 1

In the installation of FIG. 1, there is provided a subsequent transmission register NR connectable through a register coupler RK to a selected one of the external connection sets EVS. In an actual system, a plurality of the registers NR and register couplers RK is proved. The registers NR and couplers RK are selectively connected together for coupling, in time-shared relationship, to the external connection sets EVS. The time sharing process results in more efficient use thereof and thus reduces the cost of the installation for a given traffic handling capability. The number of registers NR and couplers RK therefore may be about one-tenth that of the number of external connection sets EVS. However, if desired, external connection sets EVS may include internal circuit systems capable of performing the functions of the subsequent transmission registers NR, whereby the latter, and the couplers RK, may be eliminated.

As described previously, the dial receiving register WE is provided for receiving and registering a first group of digits of a dial information code to identify the type of connection demanded by the calling subscriber and to produce request signals for requesting the establishment of predetermined connections within the installation for completing the demanded connection.

By contrast, the subsequent transmission register NR, as more fully described below, operates to receive and register a second group of digits comprising the remaining digits of the dial information code transmitted by the calling subscriber. The register NR also includes circuit means comprising a transmitter SE for transmitting the second group of digits of the dial information code through the external connection set EVS and to the external line L in proper time relationship corresponding to the requirements of the external connection, and for instructing the remote exchange of the demanded call connection. In addition, dial signals transmitted from the subscriber circuits TNS and received by the dial receiving register WE can be transmitted over the external connection set EVS from the transmitter SE of the subsequent transmission register NR. The signals thus transmitted may be unaltered in their value, or may be reevaluated in marker M or altered or transformed, such as to a different code, through the operation of marker M or the subsequent transmission register NR.

As will be described more fully hereafter, the switchover is controlled so that it occurs generally during the pause or blanking period between successive dial signals representative of digits of the dial information code, to assure that no digits are lost during the switchover. Since the installation employs a time-sharing technique in the utilization of the circuit components for maximizing efficiency, instantaneous response of the system to a commutation request is not always guaranteed. For example, the marker M may be engaged in responding to other requests at the time of receiving a switchover request from register WE, and additional requests may precede that of register WE. Although in accordance with known techniques, the marker M may be made to respond to requests on a priority basis, related to urgency or criticality of the request and not merely the chronological order in which the requests are received, under heavy load conditions, the delay of the marker M may nevertheless exceed the permissible period of switchover.

In the following discussion, it will be assumed that the demanded call connection is for an external connection and that the circuit systems such as register WE, subsequent transmission register NR, register coupler RK and external connection set EVS, are free or available to be connected into the circuit to complete the demanded call connection and that set EVS and line L are associated with the appropriate route. The installation of FIG. 1 may be adapted to respond to either tone frequency signals, representing the dial information code output of push button or keyboard-type subscriber sets, or to pulse signals representing the dial information code output of more conventional rotary digit dialing subscriber sets. For purposes of this description, however, the installation of FIG. 1 will be assumed to operate as a tone frequency dialing system.

As discussed previously, calling subscriber TN is initially connected through switching matrix KF to the dial receiving register WE upon commencing a call.

Contact *a* of dial receiving register WE is closed when the latter is seized for responding to the calling subscriber TN. The tone frequency dial information code from subscriber TN, upon closure of contact *a* of register WE, is received by a tone dial receiver TW in the tone dial receiving register WE and registered in a register Sp. The register Sp has a register capacity, or a number of individual register units, corresponding to the maximum number of dial information digits which are to be processed in the exchange installation. The register Sp further includes means for evaluating the dial information digits registered therein to determine whether they represent a demand for an internal or an external connection. The operation of a tone dial receiver TW and a register Sp in this manner is well known in the art and, therefore, is not described in detail herein.

The evaluation of the dial digits registered in register Sp may be initiated only after receipt therein of the dial signals representing a certain predetermined number of dialed digits; in the alternative, the evaluation may be initiated concurrently with the receipt of dial signals corresponding to each digit, in sequence. The evaluation of the dial digits concurrently with their receipt permits more rapid response of the installation in completing the demanded call connection and therefore is preferable. It shall be assumed hereafter that the evaluation process of register Sp is initiated upon, or in response to, receipt of the third digit of the information code dialed by the subscriber TN. In accordance with the foregoing discussion, the first three digits, therefore, may comprise the first group of route determining digits of a dial information code.

If the evaluation process of register Sp determines that the first group of digits registered therein suffice to identify a call connection which the installation is capable of completing, a request signal is sent to the central marker M. The generation and transmission of the request signal is effected by closure of contact v, as described in detail later, in response to the evaluation operation of the register Sp. Marker coupler MA responds to closure of contact v to connect the marker M to the dial receiving register WE. When the connection is established, the digits of the dial information code stored in register Sp are transmitted from it through the coupler MA and to the marker M. The marker M recognizes the route demanded for the call connection, as represented by these digits, and effects switching of the switching matrix KF to connect the subscriber circuit TNS of the calling subscriber TN through the matrix KF to an external connection set EVS corresponding to the route of the demanded call connection. It is assumed that the connection set EVS corresponds to the route of the demanded call connection.

Marker M, through connection coupler MA, also connects a subsequent transmission register NR through register coupler RK to the seized external connection set EVS. Contact a of dial receiving register WE is thereupon opened. Subsequent digits of the information code dialed by subscriber TN, comprising, in a normal or non-overload operation, the second group of digits as defined above, are thereupon transmitted through the internal connection of switching matrix KF and to the external connection set EVS. When the external connection set EVS is thus connected in circuit, contact b thereof is closed. Thus, the dial signals representing the second group of dial information digits is conducted through the contact b and the register coupler RK and is received by the dial tone receiver TWE of the subsequent transmission register NR. The information digits thus received are registered in register SPE of the subsequent transmission register NR and subsequently are transmitted to the external connection line L by the transmitter SE in response to an appropriate control signal. The transmission of the information digits from the transmitter SE to external line L is in the same sequence as that in which the digits are received from the subscriber circuit TNS.

As mentioned previously, the switchover of the subscriber from the first to the second circuit system must not occur during a dial signal, and thus must occur, or be effected generally during the pause or blanking period between dial signals corresponding to successive digits of the dial information code. Ideally, the switchover occurs during the blanking period following the first group of route defining dial digits and prior to the second group of call connection digits, such that the first and second groups are selectively received in the first and second circuit system, respectively.

In a tone frequency dialing system, digits of a dial information code are represented by respectively corresponding, predetermined frequency signals. The receiver of a subscriber such as TN includes a plurality of buttons corresponding to the digits which are selectively actuatable to produce, in sequence, the dial signals of a dial information code. The subscriber may actuate the buttons in rapid succession, and, particularly, in much more rapid succession than with the more conventional rotary digit dial systems. As a result, the blanking period between dial signals representing successive digits of a tone frequency dial information code may be of very short duration, and, in particular, may be substantially shorter than that of a rotary dial system.

As also described previously, the central marker M effects the switching of the matrix KF for establishing demanded call connections between each of the subscribers and each of the circuit systems associated with the switching matrix KF. The central marker M is therefore time-shared in responding to the demands and requests placed upon it. As a result, the central marker M may be occupied in performing a switching function in response to a previous request or demand at the same time that a subsequent request or demand is made to it.

For example, the switchover request transmitted to marker M from contact v of dial receiving register WE may occur while the central marker M is engaged in other operations. The central marker M is capable of responding to an effecting switching in only a fraction of the blanking period between successive dial signals of an information code. Thus, despite some delay in its response, it may nevertheless successfully respond to and complete the appropriate switchover during the blanking period following receipt of the last digit of the first group of digits of the dial information code. Thus, the request signal is maintained for a portion of the blanking period in excess of that actually required for the switchover, so that the central marker M has an opportunity to respond thereto.

Although switchover is effected rapidly, it obviously requires a finite time period, and thus cannot be initiated subsequently to the predetermined portion of the blanking period. As discussed previously, the blanking period is that period of time between successive dial signals. The blanking period in any given case therefore is a function of the rate at which a given subscriber selects the digits at his subscriber set for producing a dial information code demanding a given call connection. By experience, the average blanking periods for either tone frequency or digit dialing systems may be determined, as well as the range of such periods. The effective length of the blanking period and thus the predetermined portion thereof may therefore be defined in accordance with the values thus determined for a given installation operation.

Under heavy load conditions, the central marker M may not be able to respond to a given request during the described portion of the blanking period. It is also apparent that the potentially more rapid transmission of a dial information code in a tone frequency system reduces the duration of the blanking period and thus further increases the possibility that the central marker M will not be able to respond to a switchover request during the described blanking period. Since the subscriber TN is not informed of the loading conditions on the installation and since it is desirable that the subscriber TN be able to continue dialing without regard to the loading conditions, a dial signal representing a digit of the second group of dial information digits may be transmitted prior to the first opportunity of the central marker M to respond to the request from register WE for commutation of the calling subscriber TN. Since the dial receiving register WE is intended to receive only the first group of route-defining digits of a given information code, it is apparent that, absent other provisions, dial signals subsequently received in the register WE, or received during switchover, would be lost or mutilated and the demanded call connection would not be completed or would be completed incorrectly.

To prevent the loss or mutilation of dial signals, the central marker M further includes a supervision circuit system US. If the central marker M does not respond to a switchover request signal, as described above, within a predetermined portion of the blanking period, the supervision circuit US is connected to the dial tone receiver TW of the dial receiving register WE.

The exchange installation of FIG. 1 may have various alternative modes of operation in response to the overload condition described above. In accordance with one mode of operation, under overload conditions, if switchover of the calling subscriber has not been effected when a subsequent signal is received in the dial tone receiver TW, the latter produces an appropriate signal which is transmitted to the supervision circuit US. Upon receipt of such a signal, supervision circuit US recognizes that an overload condition exists, and that the necessary switchover of the calling subscriber TN from the dial receiving register WE to the appropriate external connection set EVS has not taken place within the prescribed time period. Upon recognition of the overload condition, supervision circuit US causes marker M to release the previously established connection to the subscriber circuit TNS of the subscriber TN. When subscriber TN recognizes that the demanded connection has not been completed, such as by return to him of the conventional dial tone prior to his completion of dialing, he will re-dial the appropriate information code.

The complete release of the connection under overload conditions through the operation of supervision circuit US obviously is effective to avoid malfunction of the installation. Such a connection release is infrequent, and thus is not objectionable. The connection release occurs in a minimum of time, since the individual switching steps necessary to effect the release occur very rapidly and since the longest waiting period of the dial receiving register WE during which the request to the marker M is maintained, and the operating time of the marker M itself, are each, as a rule, shorter than the shortest duration of the pauses or blanking periods between subsequent dial signals of the dial information code. The shortest pause duration is determined by the maximum transmission speed capabilities of the telephone set of the subscriber TN, as discussed above. Thus, the connection release is effected in a minimum of time, whereby the subscriber TN and the dial receiving register WE are thereupon immediately available for subsequent connections.

A common technique in tone frequency systems is to announce each tone frequency dial signal by a preceding, preparation signal. The preparation signal assures that acoustical signals, such as voice communications or extraneous noises of the calling subscriber do not cause the tone dial receiver to be excited. The preparation signal typically is of a specified time period, for example 10 milliseconds, and is produced by switching a resistor into the subscriber circuit for the specified time period, thereby lowering the line current in the subscriber line connecting the subscriber circuit TNS to the matrix KF.

As described above, tone frequency dial systems enable a subscriber to more rapidly select and transmit a dial information code, with a resultant decrease in the duration of the pause or blanking period between successive dial signals. The installation of FIG. 1 responds to the preparation signal, however, to effectively extend or expand the time period within which switchover may take place. In effect, the duration of the preparation signal is available, in addition to the duration of the pause between successive tone frequency dial signals for the switchover process. For this purpose, the installation of FIG. 1 further includes a transmission network UN and a supervision circuit US. When dial receiving register WE receives a preparation signal for a dial signal in excess of those of the first group of route identifying dial signals properly transmfitted to the dial receiving register WE, and thus of a preparation signal occurring at a time subsequent to the time at which switchover ideally should have occurred, it transmits an indication to the supervision circuit US. Supervision circuit US is operable, in cooperation with marker M and coupler MA, to connect the transmission network UN to the dial receiving register WE in question and to a subsequent transmission register NR to transmit to the latter the described preparation signal. The operation of the supervision circuit US and the transmission network UN is described in detail hereinafter.

Another manner in which the installation of FIG. 1 expands the permissible switchover period relates to the timing of the switchover request. Dial receiving register WE recognizes the route of the demanded call connection substantially simultaneously with the recipt of the dial signal representing the last digit of the route defining group of digits. As described more fully hereafter, the switchover request signal may be transmitted by register WE to marker M immediately upon such recognition. As a result the remainder of the duration of the last route defining dial signal is also available for switchover.

The transmission network UN is selectively connectible to a given one of the plurality of subsequent transmission registers such as NR, and to a given one of the plurality of dial receiving registers such as WE. The connection of the transmission network UN to a subsequent transmission register NR is effected through closure of contacts $1vm$ and $2vm$ of the latter; the connection thereof to a dial receiving register WE is effected through closure of a first contact $2vn$ and a second contact (not shown) connected in series with winding II of relay VN. The connections thus provided assure that only a single subsequent transmission register NR and only a single dial receiving register WE may be connected in circuit with the transmission network UN at any given time.

Since it is desirable that only a single transmission network UN be provided for a given installation and since the operation thereof is on a time-sharing basis with the plurality of circuit systems of the installation it is necessary that the frequency and duration of its connections or periods of seizure to any such systems be minimized. Thus, the transmission network UN is only made available at a specified time, relative to the exchange operations in response to a given dial information code, and only under specific limiting conditions.

As has been described previously, the request signal transmitted to the marker M by the dial receiving register WE is produced immediately upon recognition by tone dial receiver TW of the receipt of the last dial signal of the route identifying group. Upon such recognition, receiver TW actuates relay V, causing contact $v$ thereof to close and to transmit a switchover request signal to marker M. Thus, the entire duration of the last dial signal necessary for route recognition need not have elapsed prior to transmission of the request signal.

Relay V2 is excited concurrently with the excitation of relay V. Relay V2 is a delayed response relay, and is commonly known as a travel time switch. The response period of relay V2 can be accurately set to a predetermined duration. Thus, relay V2 may effect closure of its contact $v2$ a predetermined time period subsequently to the transmission of the request signal over contact $v$ to the marker M and thus a predetermined time period subsequently to the recognition of the route of the demanded call connection by register Sp. If, during the period of delayed response of relay V2, the requested switchover has not been effected by marker M, contact *v*2 will close and transmit a signal through coupler MA to marker M requesting that the latter make available, with the aid of the supervision circuit system US, the transmission network UN. Transmission network UN then provides a connection of the dial receiving register WE to a subsequent transmission network NR and, through the latter, a connection to other circuit systems necessary or which may become necessary for completion of the demanded call connection.

The transmission network UN thus is requested only a predetermined time interval after completion of the evaluation of the first group of digits of the dial information code identifying the route of the demanded call connection, and then only under the condition that the marker M has not yet responded to the switchover request signal. The latter condition, namely, the connection of the marker M to the dial receiving register WE, is recognized by the latter in a manner not shown. Such a recognition technique is well known in the art, and therefore is not described herein.

Relay V2 of dial receiving register WE may be operated in an alternative manner to impose even a more limiting restriction on the time condition which must be satisfied before the transmission network UN can be requested. In the manner described previously, the relay V is energized immediately upon recognition of the first group of dial signals identifying the route of the demanded call connection and closes its corresponding contact *v* to transmit the switchover request signal to the marker M. Thus, relay V is energized prior to completion of the last dial signal of the route identifying group. Conversely, relay V2 may be energized only upon completion of the last dial signal. As a result, the time condition is further restricted in that the response time of relay V2 for closure of contact *v*2 comprises a predetermined portion of the actual pause or blanking period following the end of the last dial signal of the first group of route identifying digits.

Thus, the transmission network UN can be requested only under the condition that the delay of marker M in responding to the request signal exceeds the total duration of the portion of the last dial signal occurring subsequently to the transmission of the request signal, plus the response period of relay V2, the latter comprising a predetermined portion of the actual blanking period following the last dial signal. The transmission network UN therefore will not be requested unless the dial signals transmitted by the subscriber are of an appropriately short duration.

The connection of circuit systems by the transmission network UN, described briefly above, will now be described in detail. In response to the request for the transmission network UN by a dial receiving register WE, the supervision circuit US is connected over marker coupler MA to the requesting dial receiving register WE and to an available subsequent transmission register NR, i.e., a register NR not currently connected in circuit for completing another, previously demanded call connection. Supervision circuit US then effects a scanning of the plurality of dial receiving registers WE of the installation to determine if the transmission network UN is available to respond to the request. As will be described, when the transmission network UN is engaged in a connection, contact 1*vn* of the dial receiving register, such as WE, to which the network UN is connected, is closed. Closure of contact 1*vn* places ground potential on the output line associated therewith. By scanning the said output line of contact 1*vn* of each dial receiving register WE associated with the installation and recognizing the absence or presence of ground potential at each of the said output lines, the supervision circuit US determines if the transmission network UN is available or whether it is seized in a previous connection, respectively. Thus, if ground potential is not present, the network UN is available.

If transmission network UN is available, the supervision circuit US effects energization of relay VN of dial receiving register WE and of relay VM of the corresponding and previously seized subsequent transmission register NR. It will be noted that relay VN includes two windings VNI and VNII, which are each energized and effect closure of their respective contacts 1*vn* and 2*vn*. Similarly, relay VM includes two windings VMI and VMII, the energization of which effects closure of their respective contacts 1*vm* and 2*vm*. As described previously, closure of contact 2*vn* and another contact (not shown) associated with relay VNII effects connection of transmission network UN to the dial receiving register WE and closure of contacts 1*vm* and 2*vm* effects connection thereof to the subsequent transmission register NR. The closed position of contact 1*vn* produces ground potential on its output line, indicating that the transmission network UN is seized.

Energization of relays VN and VM produce a holding circuit including the following elements:

(1) Ground, VN(II), (UN), 1*vm*, VM(II), (UN), *ab*, W*i*, —

The notation "ground" and "—" denote power supply terminals at ground and negative voltages, respectively, in circuit 1 and all following circuits.

Upon establishment of the foregoing holding circuit (1), supervision circuit US disconnects itself from the circuit systems WE and NR. If thereafter the preparation signal for a further dial signal is received in the dial tone receiver TW of the dial receiving register WE, relay V1 is energized. Energization of relay V1 effects closure of its corresponding contact 1*v*1 to establish the following circuit:

(2) Ground, 1*v*1, 2*vn*, (UN), 2*vm*, V3, —

Energization of relay V1 therefore causes energization of relay V3. It will be noted that relay V3 includes two windings V3(I) and V3(II). Energization of the relay V3 effects closure of the corresponding contact 1*v*3, 2*v*3, and 3*v*3. Closure of contacts 1*v*3 provides a holding circuit for the relay V3 as follows:

(3) Ground, 1*v*3, V3(II), *ab*, W*i*, —

Closure of contact 2*v*3 provides a short circuit or shunt path across the terminals of the relay VMII, whereby the latter is de-energized. Since energization of relay VMI was terminated upon release of the supervision circuit ES, the contacts 1*vm* and 2*vm* open and release the transmission network UN.

Closure of contact 3*v*3, in accordance with circuit (2), applies a ground potential signal to the dial tone receiver TWE of the subsequent transmission register NR, which ground potential signal corresponds to the preparation signal for the next dial signal. Dial tone receiver TWE therefore responds to the ground potential signal, as the equivalent of the described preparation signal, to switch itself into a standby condition in which it is ready to receive subsequent dial signals.

An additional time period has thus been established within which marker M may respond to a switchover request signal from dial receiving register WE. The expanded time period now comprises that period from the initial receipt of the request impulse from register WE through the preparation signal of a subsequent dial signal. Assuming that the marker M does respond to effect the necessary switchover, subscriber TN is connected through switching matrix KF to the corresponding seized external connection set EVS. Marker M then causes contact *a* of dial receiving register WE to open and contact *b* of the external connection set EVS corresponding thereto to close. The next arriving dial signal is transmitted through the switching matrix KF to the external connection set EVS and through contact *b* thereof, and through the register coupler RK to the dial tone receiver TWE of the corresponding seized subsequent transmission register NR.

There may be provided means for transmitting one or more dial signals from the dial receiving register WE and through the transmission network UN to the subsequent transmission register NR, in addition to the effective transmission of a preparation signal thereto as hereinbefore described. It is apparent that the dial signal thus transmitted is one which is not to be received or registered in the dial receiving register WE. Switchover of the calling transcriber TN from the dial receiving register WE to the seized, corresponding external connection set at EVS may then proceed under control of the marker M during the pause or blanking period following a dial signal transmitted in the manner described.

As discussed above, the urgency of effecting switchover is a function of the duration of the pause or blanking period following the last dial signal of the route identifying group. In the event that a subscriber dials slowly, this blanking period may be of substantial duration. Thus, although the supervision circuit US has effected connection of the dial receiving register WE to a subsequent transmission register NR through the transmission network UN in the manner described in response to an overload condition, the marker M may become available to respond to a switchover request signal prior to receipt of a preparation signal for a susbsequent dial signal in the dial receiving register WE.

In this event, marker M performs the necessary switching for effecting switchover of the calling subscriber TN to the previously seized corresponding external connection EVS. In effecting the switchover under these conditions, the marker M transmits a signal through the coupler MA to the relay AB of the subsequent transmission register NR. Energization of relay AB opens the contact *ab*, thereby breaking the circuits (1) and (3) above. Thus, transmission network UN is released from the connection and the previously described switchover performed by marker M causes the preparation signal for subsequent dial signal to proceed directly to the external connection set EVS.

Following the switchover, under any of the operations described above, the connection through the switching matrix KF of the calling subscriber TN with the dial receiving register WE, is terminated, the latter previously having been de-energized, as a result of opening of contact *a* thereof, and the register WE is released.

Subsequent digits dialed by the subscriber TN are received in the dial tone receiver TWE of the subsequent transmission register NR, are registered therein by register SPE, and, at an appropriate time, are transmitted by transmitter SE to the external connection set EVS and its corresponding external line L, as hereinbefore described. There may also be transmitted additional digits which, in a given case, may be modified in a suitable manner by the marker M and transmitted to the subsequent transmission register NR.

When the information stored in the register SPE of the subsequent transmission register NR is completely read out, the latter disconnects itself from the external connection set EVS, whereupon contact *b* of the latter is opened and contact *c* is closed. Further dial signals as may be required for the demanded call connection may be transmitted thereafter by the subscriber directly to the external line L.

In the alternative, the subsequent transmission register NR may be disconnected in response to another condition or a signal. For example, the subsequent transmission register NR may remain connected until completion of the entire dial information code. The subsequent disconnection may be effected in response to a completion signal indicating the end of the dial information code, the completion signal also being transmitted over the external line L. In such a delayed disconnection technique, the entire dial information code is received in the dial tone receiver TWE of the subsequent transmission register NR and transferred to register SPE thereof. The delayed disconnection may be employed for providing transformation of the dial code signals, such as from tone dial signals to pulse signals, in accordance with required characteristics of dial signals for transmission over external line L. The subsequent transmission register NR may provide the transformation of the dial signals in accordance with well-known techniques, prior to transmission from the transmitter SE thereof to the external line L.

It will be apparent from the foregoing discussion of the exchange installation of FIG. 1 that the latter is highly efficient in its operation in accordance with each of the various modifications thereof and provides accurate and rapid response to dial information codes for establishing a demanded call connection. In particular, the dial receiving register WE is connected in circuit in non-overload conditions only for a period sufficient to determine the route of the demanded call connection. Switchover of the calling subscriber from the dial receiving register WE to an appropriate external connection set EVS by the operation of marker M proceeds quickly and within less than the duration of a single blanking period or dial pause following the recognition of the route. Further, the subsequent transmission register NR is connected in circuit for completing a call connection only for at most the duration of the remaining dial information code and thereafter is also released. The subsequent transmission register NR and/or the central marker M may provide necessary transformation of received dial information code signals to produce a dial information code characterized by signals corresponding to those required for transmission over external line L to a remote installation to complete the demanded call connection.

The installation of FIG. 1 also provides for extending the permissible time period within which switchover may be effected. The increased commutation period is gained in one manner by requesting switchover upon recognition of the route, and then substantially simultaneously with receipt of the last route identifying dial signal. The remaining portion of that dial signal is thus made available for switchover. The permissible switchover period is further increased through response to the preparation signal related to the dial signal of a tone frequency dial system. In this operation, a single transmission network UN is provided for the entire installation and utilized in time sharing relationship with all of the circuit systems of the installation. To assure efficiency in operation, highly restrictive conditions are placed on the request of the circuit systems for the operation of the transmission network UN. Further, the latter is connected in circuit only for the minimum time essential for completing the connection. Thus, the installation of FIG. 1, by expanding the permissible switchover period, operates to insure that switchover is successfully affected even under heavy load conditions of the exchange installation.

FIG. 2

The exchange installation of the invention as set forth in the embodiment of FIG. 2 has been described briefly above under the heading "FIGS. 1 and 2." The circuit systems of the installation of FIG. 2 have been identified previously and the features thereof shared in common with those of the installation of FIG. 1 have also been discussed.

The first, or dial receiving circuit system of FIG. 2 comprises a dial set WA analogous to the dial receiving register WE of FIG. 1. Dial set WA is connected through matrix K to the subscriber set TLS of a calling subscriber TL by the operation of the market SM and associated marker coupler MA. The dial set WA, in contrast to the dial receiving register WE, however, does not have a registration capability such as provided by the register Sp of the register WE. The dial set WA includes a relay meter chain RZ1 for counting the dial signals of the dial information code transmitted from the subscriber TL. The relay meter chain RZ1 corresponds to the use of the more conventional digit dialing telephone sets for each subscriber TL. However, the telephone sets of subscribers TL may comprise tone frequency signal transmitters and the dial set WA may be suitably provided with dial tone receivers, operating in the manner discussed with regard to the dial receiving register WE of FIG. 1.

In the installation of FIG. 2, a register for responding to the dial information code is included in the marker, which thus comprises a register marker SM, having associated therewith the marker coupler MA. The register may be provided as a separate system from the marker, although, for simplifying the discussion and the presentation of the embodiment of the invention shown in FIG. 2, such an alternative, independent register has not been shown or described herein.

When a subscriber such as TL commences a call, such as by lifting the receiver of his telephone set, a request signal is transmitted from a second output of the corresponding subscriber circuit TLS to the register marker SM through the associated marker coupler MA. The register marker SM identifies the calling subscriber TL and effects switching of the matrix K to connect the corresponding subscriber circuit TLS to a free or available dial set WA. In establishing the described connection, contact 1*g*1 of dial set WA is closed, energizing a subscriber feeding relay A1, only one of two windings of which is shown, for establishing a supply circuit to the subscriber TL. Subscriber TL is thereby informed that he may commence dialing, and therefore he begins selection of the appropriate digits for demanding a desired call connection, which digits are transmitted as a dial information code to the dial set WA.

In the following discussion, it is assumed that the installation of FIG. 2 comprises a digit dialing system. In such a system, each digit is represented by a series of pulses. In dial set WA, the relay meter chain RZ1 is maintained in a holding condition for receipt of each such series of dial pulses to determine the digit represented thereby and, following the determinations, is read-out and reset to the holding condition. To provide such an operation, it will be assumed that relay A1 is normally energized and is de-energized in response to each pulse of a pulse series representing one digit to alternately open and close its contact 2*a*1 a number of times equal to the number of pulses in each series thereof received. The pulses of the pulse series thereby are transmitted by the alternative opening and closing of contact 2*a*1 to the relay meter chain RZ1.

The holding and reset conditions of the relay meter chain RZ1 are effected through the operation of a delayed response relay V and its corresponding contact 2*v*. The delayed response V is energized in response to the receipt by relay A1 of each series of dial pulses, through the action of the latter's contact 1*a*1. Relay V remains energized throughout the duration of the entire series of pulses, maintaining its corresponding contact 2*v* in an open position and thereby placing the relay meter chain RZ1 in a holding condition throughout the duration of a series of pulses for a given digit.

The termination of the series of pulses corresponding to a given digit results in termination of the energization of relay V, whereupon the latter, in accordance with its predetermined time delay effects closure of the contact 2*v*. Upon closure of contact 2*v*, a signal representing the digit corresponding to the series of dial pulses received in the relay meter chain RZ1 is transmitted through the now closed contact 2*v* to the register marker SM. When the digit has been received and registered by register marker SM, the latter transmits an acknowledgment signal to the relay meter chain RX1. The acknowledgment signal may be transmitted over the same circuit as the digit information signal or over another circuit (not shown), as desired. Relay meter chain RX1 is thereby returned to its holding position for receipt of a subsequent series of dial signals corresponding to a subsequent digit of the dial information code. Register marker SM thereupon disconnects itself from the dial set WA, and remains disconnected until read out of a successive digit from the dial set WA is required.

The transmission of the digit information, as described above, to the register marker SM may be effected in any desired manner, such as through pulse emissions, tone frequency signals, or direct current, coded signals. Depending upon the particular form of transmission, several circuits corresponding to the contact 2*v* are provided.

The dial set WA therefore operates in the manner described above to transmit to the marker SM information representing the digits of the first group of digits of a dial information code identifying the route of the demanded call connection. As discussed above, the register marker SM is disconnected from the dial set WA, which is responding to the demanded call connection of a given subscriber TL, subsequently to receiving the information corresponding to each digit of the dial information code.

The register marker SM is therefore connected to the external connection set ES to receive the digit information from relay meter chain RZ2 and disconnected therefrom in an alternate fashion for each digit.

However, in a well-known manner, appropriate identification means are provided in the register mark SM which ascribe an assigning criterion to dial information received, such that each successive digit registered therein is identified in accordance with the corresponding calling subscriber TL and responding dial set WA.

When the first group of route identifying digits has been received and registered in register marker SM, the register marker SM evaluates the complete route-identifying digit information and determines the traffic route of the call connection demanded by subscriber TL. The register marker SM thereupon effects the necessary switching of matrix K to connect the subscriber circuit TLS of the calling subscriber TL to an available external connection set ES corresponding to the traffic route demanded.

The subscriber TL therefore is connected both to an external connection set ES and to a dial set WA. Since contact 1*g*1 of the latter remains closed at this point in the switching operation, the subscriber circuit TLS continues to be supplied with direct current power from the dial set WA. Upon completion of the above described switching process by the register marker SM, the latter transmits a signal to the dial set WA to energize relay F thereof. Relay F remains energized over a holding circuit, not shown, to close contact *f* thereof. Register marker SM thereupon disconnects itself from the dial set WA.

Relay A1 is energized during a dial pause, or blanking period between successive pulse series. Thus, during a blanking period, it effects closure of its contact 3*a*1. Further, for the time period determined by the response time of relay V following termination of its energization during receipt of a pulse series, but before its delayed response thereto to operate its contact 1*v*, the contact 1*v* remains in the position shown in FIG. 2. Thus, a completed circuit is established from the stationary terminal of contact 1*v* and through the contact 1*v* in the position indicated, the contacts 3*a*1 and *f*, now positioned oppositely to that indicated, and relay G1 to ground. The establishment of ground potential at the contact 1*v* comprises an identification signal indicating that the dial set WA has completed its functions and that the switchover of the calling subscriber TL to the appropriate second system such as external selection set ES should be effected.

Supervision circuit UE responds to the identification signal from the dial set WA in effecting switchover. In performing this function, the supervision circuit UE continuously performs a cyclical scan of each of the dial sets WA. In particular, the supervision circuit UE scans the output line of each of the dial sets corresponding to the line connected to the stationary terminal of contact 1*v*.

Thus, the supervision circuit UE hunts over the circuit:

(4) (minus in UE), (AK), . . . , 1*v*, *f*, 3*a*, G1, Ground

If the said output line is at ground potential, the supervision circuit UE recognizes that switchover should be effected. By contrast, if a negative potential exists at the stationary terminal of contact 1*v*, this comprises an indication that the dial set WA is "overrun"—i.e., that a subsequent dial signal is being received and therefore switchover cannot be effected.

A ground potential signal at the prescribed output line, as described above, exists for only during a blanking period or a dial pause. In addition, a ground potential signal is established only for the condition that relay V is in a holding position, maintaining contact 1*v* in the position indicated, and thus that a predetermined portion of the dial pause or blanking period has not as yet elapsed. Further relay A1 must be in an operating condition and thus energized, indicating that subsequent pulse series are not being received, and finally that relay F has been energized, indicating that the marker-register MA has recognized the route of the demanded call connection and has connected the calling subscriber to an appropriate external connection set ES.

When the supervision circuit UE finds a dial set WA at which ground potential exists on a described output line, the external connection set ES corresponding to the subject dial set WA is assigned to it in preparation of the switchover to be effected. The assignment preferably is effected by the operation of connection coupler MA in response to an appropriate request by circuit UE. The assignment information may be derived in any suitable manner, such as a suitable indication from the register marker SM which, as previously described, contains the necessary information for identifying the associated dial set WA and the corresponding external connection ES and also the condition that the dial set WA is prepared for switchover. Alternatively, circuit testing or scanning means may be provided for establishing the switchover information.

As a further alternative, marker SM, after establishing the connection of the calling subscriber TL over the switching matrix K to an external connection set ES, may thereupon establish a connection of the supervision circuit UE to the dial set WA which is prepared for switchover, and to the corresponding external connection set ES. The register marker SM can establish this latter described connection either immediately following the connection to the external connection set ES or only in response to the additional determination that the supervision circuit UE is available, i.e., is not participating in another circuit connection. In the latter case the register marker SM may perform a scanning operation to determine which of the dial sets WA is prepared for switchover. The marker SM may then connect the supervision circuit UE, when it is available, to the corresponding dial sets WA and external connection sets ES in sequential fashion.

The supervision circuit UE, when connected in any of the foregoing manners, then effects the switchover as hereinbefore described. During the switchover, relay G in the external connection set ES and relay G1 in the dial set WA are energized. Although the energization thereof may be simultaneous, preferably relay G responds before relay G1 to assure that a power supply to the calling subscriber TL is maintained at all times. Objectionable switching noises are thereby prevented from occurring at the subscriber circuit during switchover. Energization of relay G closes contact *g* whereby external connection set ES provides the supply of power to the calling subscriber TL. Conversely, energization of relay G1 opens contact 1*g*1 to terminate the supply of power from dial set WA to the calling subscriber TL.

Alternative techniques in the switchover steps may be employed whereby the functions and circuits of the supervision circuit UE may be simplified and the connection thereof with the external connection set ES may be eliminated. In accordance with such a technique, the appropriate signals for switching the power supply for the subscriber circuit TLN from the dial set WA to the external connection set ES may be produced by the corresponding dial set WA.

After the switchover has been completed, all further dial signals transmitted by the subscriber circuit TLS are received in the external connection set ES and transmitted from the latter for registration in the register marker SM. As described previously, relay G is energized during the described switchover, resulting in closure of its contact *g*. Relay G remains energized through a holding circuit (not shown). Relays H and V4 operate in a manner analagous to that of relays A1 and V of dial set WA. Thus, for each pulse of the series of dial pulses corresponding to single digit, relay H alternately opens and closes its corresponding contact 2*h* to provide signals to the relay meter chain RZ2 representative of the series of pulses. Relay V4 is a delayed response relay, and is energized during receipt of a pulse series to continuously maintain its corresponding contact 2*v*4 open. A predetermined time following termination of the pulse series, as determined by the response time of relay V4, its corresponding contact 2*v*4 is closed to read out the stored digit information to the register marker SM.

As described previously, the registration of the digit information in the register marker SM is effected in accordance with assigning criterion corresponding to the calling subscriber TL and the external connection set ES involved in the call connection. Dial signals received both prior to switchover, and thus over dial set WA, and those received subsequently thereto and thus over external connection set ES, carry identical assigning criteria. The dial signals for a given dial code thus are registered under a single identifying criterion and are subsequently transmitted to the external line L1 in the same order in which they were originally transmitted by subscriber TL. The necessary circuits for this connection are well known and are not shown.

Upon completion of the switchover and transmission of the dial signal information over external line L1, the dial set WA and the connection of it through switching matrix A to the calling subscriber TLS is released. A speaking connection from the subscriber TL to the external line L1 is then completed by closure of contact 1*c*1 in a manner not shown. Appropriate means are provided to respond to completion of the call, such as by responding to the replacing of the calling subscriber's receiver, to terminate all prevous connections established in completing the call connection. Such termination or release mechanisms are well known in the art and are not described in detail here.

In summary, the dial set WA is released from the circuit connection upon successful completion of the switchover of the calling subscriber TL to the external connection set ES. Dial set WA therefore is immediately available for connection to a subsequent calling subscriber to assist in establishing a circuit connection. Under normal conditions, dial set WA is connected in circuit only for receiving and responding to the first group of route defining dial signals. However, during overload conditions, the dial set WA remains connected in circuit for receiving one or more of the dial signals of the second group and transmitting the latter to the central register to assure that the dial signals are neither lost nor mutilated. Dial set WA further provides an indication signal to the supervision circuit UE to indicate when permissible periods of switchover exist.

Register marker SM effects connection of calling subscriber TL to the external connection set ES when the route of the long distance call has been determined and thus subsequently to the receipt by dial set WA and the central register of the first group of route determining dial signals. Since switchover does not occur during this connection, the latter is not required to be performed only during the blanking period, since dial signals received during or subsequently to the connection may still be received by dial set WA and transmitted to the central register. Supervision circuit UE effects the switchover following the above-described connection to the external connection set ES in a rapid manner; the switchover may be effected during the blanking period immediately following the first group of dial signals, if sufficient time remains, or in the first available blanking period thereafter. The central register operates as an auxiliary dial circuit system to transmit the dial signals to the external connection set ES and its corresponding line L1 and thus to the remote installation. The transmission may therefore occur without any substantial delay and in the proper sequence in which the dial signals are received from the calling subscriber.

The dial set WA receives and evaluates the series of dial pulses representing each digit. Since the central register of the register marker SM is connected to the dial set WA only when the described evaluation is completed by the latter, burdening of the central register for receiving the dial information is minimized and the utilization and efficiency thereof is maximized. The time-sharing operation of the dial sets WA, the register marker SM and the supervision circuit UE in establishing circuit connections for completing demanded external calls contributes to high efficiency and thus reduced costs of the installation and its operation. In addition, the installation of the invention provides substantially extended periods of switchover, thereby assuring successful completion of demanded call connections.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

What is claimed is:

1. A telephone exchange installation having a switching matrix (KF; K) to which the subscriber circuit (TNS; TLS) of a calling subscriber (TN; TL) is connected and being operable to establish circuit connections in response to a dial information code from a calling subscriber (TN; TL), the dial information code comprising a first group of route defining dial signals and a second group of connection defining dial signals, said installation comprising:

a first type of circuit system (WE; WA) connected to said matrix (KF; K) for receiving the route defining dial signals of a dial information code, a second type of circuit system (EVS; ES) connected to said matrix and having an associated external line L; L1), said second circuit system (EVS; ES) being operable to transmit the connection defining dial signals of a dial information code over said associated external line (L; L1), a supervision circuit system (US; UE) operable upon recognition of the receipt in said first circuit system (WE; WA) of the first group of dial signals of a dial information code to control switchover of the calling subscriber (TN; TL) from a connection through said matrix (KF; K) to said first circuit system (WE; WA) to a connection through said matrix (KF; K) to said second circuit system (EVS; ES), said supervision circuit system including means for recognizing the arrival in said first circuit system of dial signals subsequent to said first group, for preventing the said switchover during receipt of a subsequent dial signal of the dial information code, and an auxiliary circuit system (UN; SM) operable upon receipt in said first circuit system (WE; WA) of a signal associated with said second group of dial signals of the dial signals of the dial information code to transmit said associated signal to said second circuit system (EVS; ES).

2. A telephone exchange installation as recited in claim 1 wherein there is further provided:

means (M; SM) responding to initiation of a call by a calling subscriber (TN; TL) for switching said switching matrix (KF; K) to connect said calling subscriber (TN; TL) through said matrix (KF; K) to said first circuit system (WE; WA) and responding to the receipt of said first group of dial signals in said first circuit system (WE; WA) to connect said calling subscriber through said matrix to said second circuit system (EVS; ES).

3. A telephone exchange installation as recited in claim 2 wherein:

said switching means (M) switches said calling subscriber (TN) from said first (WE) to said second circuit system (EVS) and upon successful completion of such switching, disconnects said first circuit system (WE).

4. A telephone exchange installation as recited in claim 3 wherein:

said supervision circuit system (US) responds to receipt in said first circuit system (WE) of a connection defining dial signal to effect termination of previously established circuit connections.

5. A telephone exchange installation as recited in claim 2 comprising a tone frequency dial system having tone frequency dial signals each preceded by a preparation signal and wherein there is further provided:

means (TW) for responding to the receipt of the preparation signal of a tone frequency dial signal subsequently to the receipt of said first group of tone frequency dial signals in said first circuit system (WE), and said auxiliary circuit system (UN) transmits the said preparation signal to said second circuit system (EVS) to prepare the latter for receipt, following the said switchover, of the next succeeding tone frequency dial signal.

6. A telephone exhange installation as recited in claim 3 wherein:

said first circuit system (WE) includes means for receiving (TW) and registering ($Sp$) the route defining dial signals to recognize receipt of the entire first group thereof, and said registering means ($Sp$) is operative to transmit a request signal ($v$) to the switching means (M) upon the said recognition to request the said switchover.

7. A telephone exchange installation as recited in claim 6 wherein:

said registration means ($Sp$) is effective to transmit the said switchover request signal substantially simultaneously with receipt in said receiving and registration means (TW; $Sp$), whereby switchover may be effected during the remaining portion of the duration of the last route defining dial signal.

8. A telephone exchange installation as recited in claim 6 wherein:

said registration means ($Sp$) is effective to recognize the route of the demanded call connection represented by the dial information code, and to indicate the said route to the said switching means (M).

9. A telephone exchange installation as recited in claim 6 wherein there is further provided:

delayed response means (V2) energizable upon receipt on said receiving means (TW) of said first circuit system (WE) of the last route defining dial signal and operable a predetermined time period thereafter to produce ($v2$) an auxiliary request signal, and said supervision circuit system (US) responds to said auxiliary request signal to connect said auxiliary circuit system (UN) to said first circuit system (WE) and to said second circuit system (EVS).

10. A telephone exchange installation as recited in claim 9 wherein:

said delayed response means (V2) is energized upon termination of the said last route defining dial signal, whereby the predetermined time period comprises a portion of the dial pause following the said last route defining dial signal.

11. A telephone exchange installation as recited in claim 2 wherein:

said second circuit system includes a subsequent transmission system (NR) connectable thereto during receipt and transmission of said second group of dial signals, and said second circuit system includes means for receiving (TWE) and registering (SPE) connection defining dial signals received over said second circuit system (EVS) and means (SE) for transmitting said connection defining dial signals over said second circuit system (EVS) to said external line (L).

12. A telephone exchange installation as recited in claim 11 wherein:

said auxiliary circuit system (UN) is connectable between said first circuit system (WE) and said subsequent transmission system (NR), and said receiving means (TWE) of said subsequent transmission system (NR) receives said associated signal received in said first circuit system (WE) and transmitted to said second circuit system (EVS) by said auxiliary circuit system (UN).

13. A telephone exchange installation as recited in claim 2 wherein:

there are further provided a plurality of said subscriber circuits (TNS) and a plurality of said first and second types of circuit systems (WE; EVS) connected to said matrix, said second type of circuit systems (EVS) being assigned to predetermined routes.

said switching means (M) responds to initiation of a call by a subscriber (TN) to connect said calling subscriber (TN) to an available one of said first type of circuit systems (WE) for receiving the dial information code of the calling subscriber, and said switching means (M) responds to the receipt of said first group of route defining dial signals in said first circuit system (WE) to recognize the route of the demanded call connection and to switchover the calling subscriber (TN) from said first circuit system (WE) to an available second circuit system (EVS) corresponding to that route.

14. A telephone exchange installation as recited in claim 13 wherein:

said auxiliary circuit system is operated in time-sharing relationship with said plurality of first and second types of circuit systems (WE; EVS), each of said first type of circuit systems (WE) includes means for receiving (TW) and registering ($Sp$) the route defining dial signals to recognize receipt of the entire first group thereof, and said registering means ($Sp$) is operative to transmit a request signal ($v$) to the switching means (M) upon the said recognition to request the said switchover, each of said first circuit systems (WE) further includes an output line at which an identifying signal is produced for indicating connection thereto of the said auxiliary circuit system (UN) and said supervision circuit system (US) scans said output lines of said first circuit systems (WE) to determine if the said auxiliary circuit system (UN) is available for connection to a requesting first circuit system (WE), and effects connection thereof, when available and in sequence, to each of the said requesting first type of circuit systems (WE) and the corresponding second type of circuit system (EVS).

15. A telephone exchange installation as recited in claim 2 wherein:

said switching means (SM) connects said calling subscriber (TL) to said second circuit system (ES) at its earliest availability and independently of the receipt of subsequent dial signals, and said supervision system (UE) effects said switchover at the earliest available time subsequent to the connection of said calling subscriber (TL) to said second circuit system (ES) by said switching means (SM) and during a dial pause between successive dial signals of the dial information code and occurring subsequently to receipt of said first group of dial signals in said first circuit system (WA), and said supervision circuit system (UE) disconnects said first circuit system (WA) subsequently to said commutation.

16. A telephone exchange installation as recited in claim 15 wherein:

said auxiliary means (SM) comprises a central register associated with said switching means (SM), said central register (SM) is connectable with said first circuit system (WA) to receive both route defining and connection defining dial signals received thereover, and said central register (SM) is further connectable to said second circuit system (ES) to receive and register connection defining dial signals received thereby and to transmit thereover to the said associated external line (L1) the second group of connection defining dial signals in the sequence of the dial information code as received from the calling subscriber.

17. A telephone exchange installation as recited in claim 16 wherein said installation comprises a digit dialing system, each dial signal being represented by a series of dial pulses and wherein:

each of said first and second circuit systems (WA; ES) includes means (RZ1; RZ2) for responding to each series of pulses of dial signals respectively received thereby to determine the dial signal represented thereby, and said central register (SM) is selectively connectable to each of said first and second circuit systems (WA; ES) to receive and register the dial signal determined by the said means (RZ1; RZ2) and thereafter to reset the said means (RZ1; RZ2) for receipt of a subsequent dial signal pulse series.

18. A telephone exchange installation as recited in claim 17 wherein:

said central register (SM) registers the said dial signals received from said first and second circuit systems (WA; ES) and in accordance with an assigning criterion and is alternately connected to and disconnected from each of said first and second cricuit systems for only the time period required to receive the said dial signals.

19. A telephone exchange installation as recited in claim 16 wherein:

said first circuit system (WA) produces a switchover request signal at an output thereof in response to the said connection of the said calling subscriber (TL) to the said second circuit system (ES), and said supervision circuit system (UE) responds to the said commutation request signal for effecting switchover of the calling subscriber (TN) to the said second circuit system.

20. A telephone exchange installation as recited in claim 19 wherein:

there is further provided a plurality of subscribers (TL) and a plurality of first and second types of circuit systems (WA; ES) connected to said switching matrix (K), said second circuit systems (ES) being assigned to predetermined routes, said switching means (SM) responds to initiation of a call by a calling subscriber (TL) to connect said calling subscriber (TL) to an available one of said first type of circuit systems (WA).

said switching means (SM) responds to recognition of the route of a dial information call upon receipt in said central register of said first group of dial signals to connect said calling subscriber (TL) to an available one of the second type of circuit systems (ES) corresponding to the route of the demanded call connection and identifies corresponding ones of said first and second types of circuit systems (WA; ES), said central register (SM) receives and registers dial signals of a given dial information code received from said corresponding first and second types of circuit systems (WA; ES) in accordance with an assigning criterion related to said dial information code and said corresponding first and second types of circuit systems, and said supervision circuit system (UE) scans the said outputs of the plurality of first type of circuit systems to respond in sequence to switchover request signals thereof and, in response to the said identification of corresponding first and second types of circuit systems (WA; ES) by the central register (SM), effects switchover of the calling subscriber from the said first circuit system (WA) to the corresponding second circuit system (ES) during the first available switchover period.

21. A telephone exchange installation as recited in claim 20 wherein:

said switchover by said supervision circuit comprises sequential actuation of switch means in said first and second types of circuit systems (WA; ES) to connect said second circuit system (ES) to said calling subscriber (TL) to receive said connection determining dial signals and to disconnect said first circuit system (WA) from said circuit.

References Cited

UNITED STATES PATENTS

| | | | |
|---|---|---|---|
| 2,355,908 | 8/1944 | Dehn | 179—18.21 |
| 2,901,545 | 8/1959 | Ostline et al. | 179—18.21 |
| 3,098,125 | 7/1963 | Berch | 179—18.21 |
| 3,303,288 | 2/1967 | Wirsing | 179—18.21 |

WILLIAM C. COOPER, Primary Examiner